Figure 1:
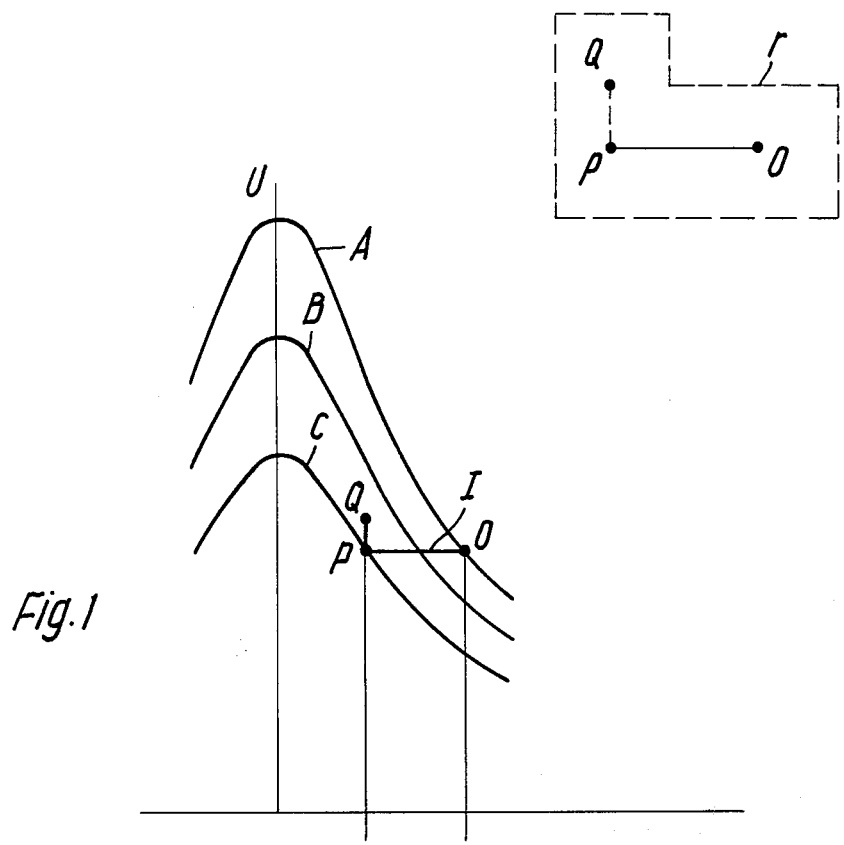

United States Patent [19]
Matthes et al.

[11] 3,942,090
[45] Mar. 2, 1976

[54] CONTROL PROCESS FOR OPERATING A PARALLEL-RESONANT CIRCUIT INVERTER THAT SUPPLIES AN INDUCTIVE CHARGE, AS WELL AS THE PARALLEL-RESONANT CIRCUIT INVERTER OPERATED BY THIS METHOD

[75] Inventors: Hans Matthes, Remscheid; Erhard Mauler, Wermelskirchen, both of Germany

[73] Assignee: AEG-Elotherm G.m.b.H., Remscheid-Hasten, Germany

[22] Filed: Sept. 18, 1974

[21] Appl. No.: 507,186

[30] Foreign Application Priority Data
Oct. 10, 1973 Germany............................ 2352473

[52] U.S. Cl.................. 321/4; 219/10.77; 321/45 R
[51] Int. Cl.².......................................... H02M 5/45
[58] Field of Search.............. 321/4, 19, 45 R, 45 C; 219/10.77

[56] References Cited
UNITED STATES PATENTS

| | | | |
|---|---|---|---|
| 3,551,632 | 12/1970 | Geisel...................................... | 321/4 |
| 3,725,770 | 4/1973 | Bailey................................ | 321/45 R |
| 3,757,197 | 9/1973 | Bailey................................ | 321/45 C |

FOREIGN PATENTS OR APPLICATIONS

| 39,900 | 11/1971 | Japan.................................. | 321/45 R |

*Primary Examiner*—William M. Shoop
*Attorney, Agent, or Firm*—Cushman, Darby and Cushman

[57] ABSTRACT

An improved parallel-resonant circuit inverter of the type having a rectifier, a thyristor DC/AC converter connected thereto and operating at a controllable frequency, a parallel resonant circuit with an inductive load and a method of operation of such circuit whereby the converter voltage U is maintained at a constant operating value $U_B$ for a constant DC current $I_g = I_{go}$, in a first control range characterized by a low resonant-circuit damping, and control of the direct current $I_g$ for the purpose of maintaining the DC/AC voltage constant at its operating value $U_B$, in the case of a constant thyristor extinction time $t_L = t_{LO}$, in a second control range characterized by a high damping, as well as by transition from the first to the second control range, if $t_L$ becomes equal to $t_{LO}$ in the case of increasing resonant-circuit damping, and transition from the second to the first control range, if $I_g$ become equal to $I_{go}$ in the case of decreasing damping.

1 Claim, 3 Drawing Figures

CONTROL PROCESS FOR OPERATING A PARALLEL-RESONANT CIRCUIT INVERTER THAT SUPPLIES AN INDUCTIVE CHARGE, AS WELL AS THE PARALLEL-RESONANT CIRCUIT INVERTER OPERATED BY THIS METHOD

The invention relates to control of a parallel-resonant circuit inverter that feeds a DC/AC converter from an alternating-current source through a rectifier and a smoothing choke in the direct current intermediate circuit.

This DC/AC converter in turn serves to feed an inductive load. In recent years, parallel-resonant circuit inverters have been adopted to an increasing degree as middle frequency generators for feeding inductors in induction heating systems, especially for forge heating, inductive quenching and inductive melting.

The DC/AC converter in an inverter of this sort consists, as is known, of a thyristor bridge connection, through which part of the direct current that is to be commutated in the bridge connection is conducted, while the parallel-resonant circuit is applied to the other part, the inductance of the parallel-resonant circuit being essentially determined by the inductor that is to be supplied. To prevent commutation through the thyristors, the parallel-resonant circuit must, as is known, always be operated with a frequency that is higher than the resonant frequency of the parallel-resonant circuit. Only in this way can the characteristic minimum thyristor extinction time $t_{Lmin}$ be preserved. The extinction time $t_L$ is, at least in the vicinity of the resonant frequency, all the greater, the more the DC/AC converter frequency $\omega$, which is determined by the modulable pulse repetition frequency of the thyristor ignition-impulse generator, exceeds the resonant frequency $\omega_R$. On the other hand, the DC/AC converter voltage U of course decreases all the more, the more the DC/AC converter frequency $\omega$ moves away from the resonant frequency $\omega_R$. Thus the ideal is to operate the DC/AC converter as much as possible in a condition in which the extinction time $t_L$ deviates only slightly from $t_{Lmin}$.

For practical requirements in operation, it is advantageous to keep the DC/AC converter voltage U constant. Control of the DC/AC converter voltage can be accomplished, in the case of varying charge, by adjusting the DC/AC converter frequency $\omega$ or that of the direct current $I_g$ that is to be commutated. As illustration of this, FIG. 1 shows resonance curves for a certain direct current value $I_{go}$, said curves corresponding to the parallel-resonant circuit voltages that can be equal to the DC/AC converter voltage U, for three different dampings, namely curve A for a small damping, B for a medium and C for a large damping as a function of the frequency $\omega$.

Figure 2:
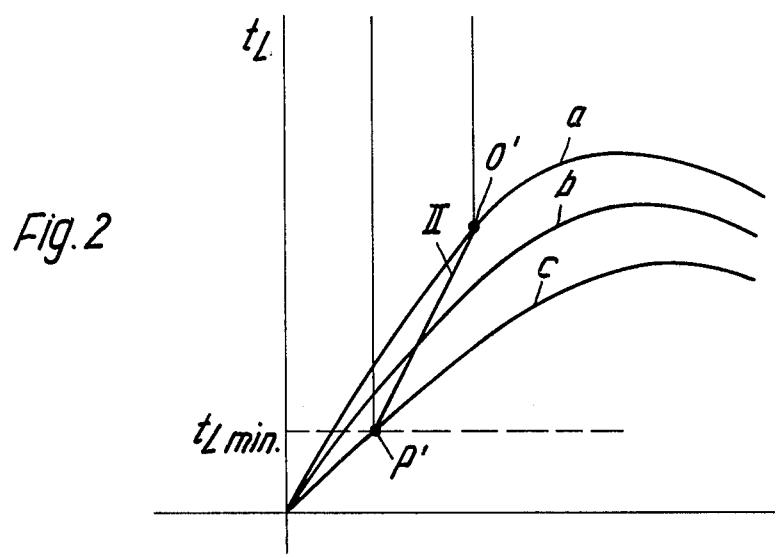

In the case of the direct current value that characterizes this set of curves, a desired voltage U can be adjusted for a certain damping within relatively wide limits, by appropriate selection of the DC/AC converter frequency $\omega$ to be greater than the resonant frequency $\omega_R$. If a change in the resonant frequency occurs, as would be expressed by a shift in the resonance curves system shown in FIG. 1 into higher or lower frequency ranges, then — assuming a constant damping and constant DC/AC converter frequency — the DC/AC converter voltage U would rise or fall along the shifting resonance curves. In the case of constant resonant or DC/AC converter frequency, a changed damping of the parallel-resonant circuit also calls forth a voltage change. (The working point on the characteristic curve changes the curve of the curve system that has been determined by the damping as a parameter.) In any case, as can easily be seen, the DC/AC converter voltage U can therefore, despite changes in the resonant frequency and the damping, be kept constant only by changing the operating frequency, and, at times, a decrease in the voltage U can be equalized by a decrease in the DC/AC converter frequency and its increase by raising the DC/AC converter frequency. However, care should be taken that the smallest permissible thyristor extinction time $t_{Lmin}$ not be fallen below. In order to make the relationships that then occur clear, FIG. 2 shows the extinction time $t_L$, also as a function of the DC/AC converter frequency, in three curves $a,b,c$ for three different resonant circuit dampings — corresponding to the resonance curves A, B and C of FIG. 1.

During operation, the minimum thyristor extinction time $t_{Lmin}$ must not be fallen below, i.e., a series of operating conditions of the DC/AC converter at constant voltage U, which correspond to Line I of FIG. 1 from point 0 to P and Line II from point O' to P' in FIG. 2, should not pass beyond point P or P', as $t_{Lmin}$ has already been reached at conditions P, P'.

On the other hand, it is also customary to control the DC/AC converter voltage U at constant operating frequency by changing the direct voltage $I_g$. A change in the direct voltage corresponds to a change in the scale of the DC/AC converter voltage U in FIG. 1, in the case of the same set of curves. If U drops from its nominal value, then this can be equalized by increasing the direct current and inversely.

The object of this invention is to combine the advantages of both control principles with respect to the thyristor properties and application in the field of induction heating, in which, in the case of many heating jobs, especially at low dampings, sudden irregular changes in charge occur. In the combined control of the invention, the DC/AC converter voltage U is also to be kept constant.

This task is first accomplished by the invented control process, which is characterized by measurement of the DC/AC converter voltage U as well as the thyristor extinction time $t_L$ during the operation, by controlling the DC/AC converter frequency for the purpose of keeping the DC/AC converter voltage U constant at its operating value $U_B$ while also keeping the direct current $I_g = I_{go}$ constant within a control range characterized by a low resonant circuit damping, and by controlling the direct current $I_g$ for the purpose of keeping the DC/AC converter voltage constant at its operating value $U_B$ while also keeping constant the thyristor extinction time $t_L = t_{Lo}$ within a control range characterized by a high damping, as well as by transition from the first to the second control range, when upon rising resonant circuit damping $t_L = t_{Lo}$, and by transition from the second to the first control range, when upon decreasing damping $I_g = I_{go}$.

The basic object of the invention is further accomplished by the parallel-resonant circuit inverter of the invention, which, designed for operation by means of the process of the invention, has a thyristor extinction time control circuit with an extinction time measuring device, and a DC/AC converter frequency control switch for purposes of controlling the extinction time by means of frequency change, as well as a direct current control circuit with a phase channel control switch for the rectifier, whereby the invented parallel-resonant circuit inverter is characterized by two reference switches that form comparison signals from the extinction time measurement signal and the direct current measurement signal with appropriate reference signals. Said comparison signals are emitted at the control inlets of a discriminator circuit, by a DC/AC converter voltage measuring device, the outlet of which leads through a nominal value-actual value comparison circuit to the inlet of the discriminator circuit, and which has two stable switch positions that can be reversed by the signals at their control inlets, whereby the inlet signal of the discriminator circuit is conducted, depending upon the existing switch position, to the first or to the second outlet of the discriminator circuit, and these outlets, for the purpose of transferring the DC/AC converter voltage control deviation, are connected with the comparison circuits of the extinction time control circuit or the direct current control circuit.

The invention will now be explained in greater detail, with reference to the circuit diagram of FIG. 3, as well as the sets of figures illustrated in FIGS. 1 and 2.

Figure 3:
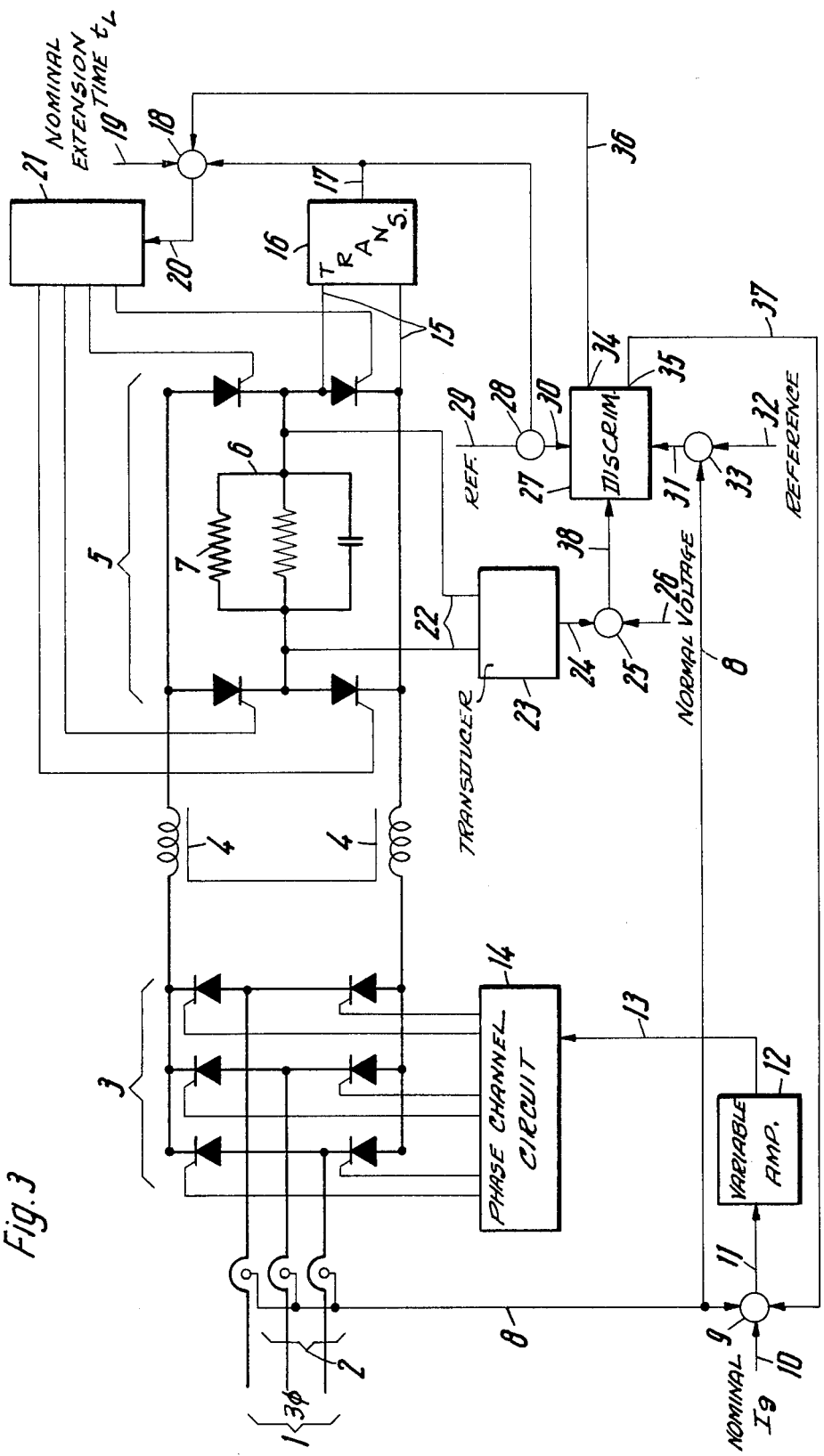

FIG. 3 shows the principal circuit diagram of a parallel-resonant circuit inverter. From three-phase main line 1, through a conventional current measuring device 2, and a three-phase current bridge connection 3, containing thyristors and controlled by means of a conventional phase channel circuit 14, a direct current intermediate circuit is fed, which intermediate circuit contains one of the two coils of a smoothing choke 4 symmetrically in both phases. Connected at the outlet side of choke 4 is a DC/AC converter bridge 5, controlled in phase with the DC/AC converter frequency 10, from which connection the parallel-resonant circuit 6 is fed.

For controlling the direct current $I_g$, a signal designating this direct current $I_g$ is emitted on the alternating-current side of the rectifier bridge connection 3 from the current measuring device 2 through line 8. From this signal and a nominal value signal applied on line 10, a comparison signal is formed in the conventional comparison circuit 9 and emitted over line 11. This comparison signal controls the phase channel circuit 14 which controls the conduction of the thyristors through variable-gain amplifier 12 and the lead line 13. By means of this circuitry, the direct current $I_g$ can always be kept at the above-indicated nominal value.

For controlling the DC/AC converter frequency $\omega$, the voltage across a thyristor in the DC/AC converter is coupled via leads 15 to transducer 16 which produces a signal indicating the extinction time $t_L$. The latter signal, on line 17, is compared in a comparison circuit 18 with an extinction time nominal value signal applied at line 19. The comparison signal emitted by the comparison circuit 18 on lead 20 controls thyristor ignition impulse generator 21 either to increase or reduce the DC/AC converter frequency. By means of this circuitry, the DC/AC converter frequency $\omega$ can always be controlled in such a way that the thyristor extinction time $t_L$ corresponding to the nominal value remains constant.

The DC/AC converter voltage, which is to be kept constant over a wide range of the inverter operation, is applied to transducer 23 via leads 22. The output 24 of transducer 23 represents the actual value signal of the DC/AC converter voltage. This actual value signal is then compared in a comparison circuit 25 with the voltage nominal value signal applied through 26 and conducted to a discriminator circuit 27 as the comparison signal indicating the DC/AC converter voltage-deviation.

The signal emitted at the outlet of the extinction time transducer 16 is further compared in another comparison circuit 28 with a reference signal applied at 29, so that, when the outlet signal of the transducer 16 falls below this reference signal, the comparison signal conducted through the first control inlet 30 of the discriminator circuit 27 activates a first commutation. A second commutation takes place when a comparison signal is conducted to the discriminator circuit 27 through a second control inlet 31, this comparison signal being formed from the direct current value signal collected from lead 8 and a reference signal conducted past 32, when the direct current value signal drops below this reference signal.

Discriminator circuit 27 has two outlets 34 and 35. The outlet 34 passes through line 36 to the comparison circuit 24 of the extinction time control and the outlet 35 through line 37 to comparison circuit 9 of the direct current control. The inlet 38 of the discriminator circuit 27 fed by the inverter voltage actual value signal is connected, depending upon the commutation signals, alternately with the first or the second discriminator outlet 34 or 35, which means that the voltage control circuit is cross-linked alternately with the direct current control circuit or the thyristor extinction time control circuit.

A commutation takes place when the extinction time $t_L$ or the direct voltage $I_g$ drop below certain associated reference values.

Operation in the two control ranges will now be explained with reference to FIGS. 1 and 2.

In the first control range, phases will pass along Lines I or II in FIGS. 1 and 2. If, upon approaching the phase point P', the extinction time $t_L$ drops below a value $t_{LO}$, which is somewhat higher than $t_{Lmin}$, a commutation signal passes through the comparison circuit 28 and the control inlet 30 to the discriminator circuit 27 in such a way that the signal of the voltage deviation, which was formerly conducted through 38 and 34 to the extinction time control circuit, where, in order to maintain the voltage $U = U_g$ constant, it controlled the frequency, is now conducted through 38 and 35 to the direct current control circuit, in which, also for the purpose of maintaining $U = U_g$ constant, the direct current $I_g$ is varied.

The phase point thereby adapts to a change in the scale of U in the case of a constant family of curves, e.g., the continuity between point P and Q in FIG. 1.

If the current $I_g$ falls and drops below the value $I_{go}$, then another commutation signal passes through the comparison circuit 33 and the control inlet 31 to the discriminator circuit 27; said commutation restores the original phase, that is the phase in the first control region.

If we take into consideration the variations in the resonant circuit damping, then we see that, with relation to a constant family of curves as in FIG. 1, the operation phases at constant DC/AC converter voltage can lie in an area that is indicated approximately by the dashed lines.

What is claimed is:

1. A method for operating a parallel-resonant circuit inverter with a rectifier, a thyristor DC/AC converter connected to this rectifier and operated with controllable frequency, which converter feeds the parallel-resonant circuit containing the inductive load, comprising the steps of measuring of DC/AC converter voltage U, and the thyristor extinction time $t_L$ during the operation, controlling the DC/AC converter frequency $\omega$ to maintain the DC/AC converter voltage U constant at an operating value $U_B$, for a constant direct current $I_g = I_{g0}$, in a first control range characterized by a low resonant-circuit damping, and controlling the direct current $I_g$ for the purpose of maintaining the DC/AC voltage constant at its operating value $U_B$, in the case of a constant thyristor extinction time $t_L = t_{L0}$, in a second control range characterized by a high damping, as well as by transition from the first to the second control range, if $t_L$ becomes equal to $t_{L0}$ in the case of increasing resonant-circuit damping, and transition from the second to the first control range, if $I_g$ become equal to $I_{g0}$ in the case of decreasing damping.

* * * * *